Patented Dec. 9, 1941

2,265,619

UNITED STATES PATENT OFFICE 2,265,619

MOLDING COMPOSITIONS

Roger G. Aitken, Westmount, Quebec, Canada, assignor to E. I. du Pont de Nemours & Company, Wilmington, Del., a corporation of Delaware No Drawing. Application December 15, 1939, Serial No. 309,360. In Canada March 2, 1939

5 Claims. (Cl. 260—42)

This invention relates to improvements in polyvinyl resin molding compositions and, more particularly, to form stable molding compositions prepared from polyvinyl acetate and/or polyvinyl acetal resins and to objects molded therefrom.

Molded articles prepared from polyvinyl acetate or polyvinyl acetals have a tendency to flow at comparatively low temperatures. This results in poor form stability of the molded articles which, if left in a warm place, tend to warp and become badly distorted. Hitherto, the only method of overcoming this difficulty has been to increase the degree of polymerization which has increased the molding temperature to an undesirable degree and increased the cost of the molding compositions.

The present invention has as an object the preparation of polyvinyl resin molding compositions which, when molded, have enhanced form stability at ordinary temperatures. A further object is the preparation of polyvinyl resin molding compositions which have a relatively higher softening point than those hitherto available. A still further object is the production of a form stable molding composition which requires little or no increase in molding temperatures. A still further object is the elimination from polyvinyl resin injection molding compositions of the lubricating substances heretofore employed. A still further object is the production of a pearl-like luster on the surface of articles produced by injection molding of polyvinyl resin compositions. Other objects will appear from the following description of the invention.

These objects are accomplished according to the present invention by incorporating with polyvinyl resin compositions, polymerized dihydronaphthalene, hydrogenated polymerized dihydronaphthalene, or the homologs thereof.

Polyvinyl acetal resins are prepared by the condensation of a hydrolyzed or partially hydrolyzed polyvinyl acetate with one or more aldehydes in the presence of a solvent and a catalyst. The aldehyde condensation may be carried out either simultaneously with, or subsequent to, the hydrolysis of the polyvinyl acetate.

The polymers of dihydronaphthalene or its homologs may be prepared according to the following procedure:

Dihydronaphthalene may be prepared by hydrolyzing the reaction product of sodium and naphthalene as disclosed in N. D. Scott United States Patent 2,055,708. The sodium-naphthalene compound is used both as a source of dihydronaphthalene and as a polymerization agent for the formation of dihydronaphthalene polymer itself. The polymer may be prepared in the manner described in said Scott patent. Briefly this method comprises polymerizing dihydronaphthalene dissolved in a suitable ether solvent by means of a reaction product of sodium and naphthalene, preferably at temperatures of 20–30° C. Hydrogenated polymers may be prepared by the method described in H. S. Holt United States Patent 2,130,800, that is, broadly, by reacting the polymer with hydrogen.

Similar resinous polymers prepared in a similar manner from the homologs of naphthalene, such as alpha-methyl-naphthalene or beta-methyl-naphthalene or similar resinous polymers prepared from acenaphthene may be employed in the present invention in place of, or mixed with, the resinous polymer prepared from naphthalene.

More complex products prepared by utilizing two or more different hydrocarbons also fall within the scope of this invention. For example, sodium naphthalene may be reacted with dihydro-acenaphthene to produce a resinous polymer suitable as a form stabilizing agent.

It has been found that, when even a small proportion of these dihydronaphthalene polymers or hydrogenated dihydronaphthalene polymers are incorporated in polyvinyl resin molding powders, the softening point of the composition is materially raised, giving increased form stability while the molding temperature is unchanged or even slightly lowered.

Dihydronaphthalene polymers having a melting point not over 155° C. and in quantities up to about 5%, by weight of the resin, of a composition comprising polyvinyl acetate or a polyvinyl acetal resin may be incorporated with the production of a transparent product. Greater quantities tend to produce an increasing amount of haze in the product. Proportions of dihydronaphthalene polymers over about 10%–12%, result in a weak and laminated product due to poor compatibility of the resins in these proportions.

It has also been discovered, however, that, when certain of these dihydronaphthalene polymers are mixed with polyvinyl acetate or polyvinyl acetal resins, not only is form stability obtained but, as the proportion of dihydronaphthalene polymer is increased, the mixture changes from a transparent body to one with increasing amounts of a pearl-like luster. In this instance the dihydronaphthalene polymers used are preferably those having a melting point about 155° C. and, more preferably, are hydrogenated dihydronaphthalene polymers as illustrated in Example V. The melting point may be increased by polymerization at lower temperature for a longer period of time or by hydrogenation or by both. The pearl-like luster starts to appear at about 5% and rapidly increases until the mixture becomes too weak, due to non-compatibility of the two resins, to be of any value. This upper limit is about 12%. It is preferred to use a mixture containing from 7 to 8% polymers of dihydronaphthalene as this proportion produces sufficient pearl-like luster for the purpose while still well within the limit necessary for the retention of sufficient strength to be serviceable.

When these mixtures are injection molded the pearl-like luster becomes very pronounced.

Dyes, pigments, other resins, fillers or lubricating substances may be added to these compositions.

This invention will be understood more completely by reference to the following examples, which are illustrative and are not intended as limitations.

*Example I.*—One thousand grams of polyvinyl acetal, prepared by the condensation of acetaldehyde and hydrolyzed polyvinyl acetate, were placed on heated rolls and worked until soft. Forty grams of dihydronaphthalene polymer having a melting point of 150° C. were added and mixing was continued until incorporation was complete. The resin was then cooled and pulverized to form a molding powder.

This molding powder was pressed between steam heated matrices to form a comb. The finished comb was found to have a softening point 10° C. higher than a similar comb pressed from the polyvinyl acetal alone.

*Example II.*—One thousand grams of polyvinyl acetate, seventy grams of hydrogenated dihydronaphthalene polymer having a melting point of 170° C. and twenty grams of titanium dioxide were mixed on heated rolls as in Example I. The incorporated mixture was cooled and pulverized to form an injection molding powder.

This molding powder was placed in an injection machine and a brush handle molded therefrom.

The finished handle had a bright pearl-like luster and was quite rigid at 40° C. while a similar composition without the hydrogenated dihydronaphthalene polymer warped out of shape when left in a room at 25° C.

*Example III.*—One thousand grams of polyvinyl acetal resin prepared by the condensation of acetaldehyde with hydrolyzed polyvinyl acetate were mixed on heated rolls with 70 grams of dihydro-acenaphthene polymer, 3 grams of titanium dioxide, 40 grams of hydrogenated castor oil and 2 grams of Soudan Blue. After incorporation, this mixture was cooled and pulverized, to form an injection molding powder.

This molding powder was placed in an injection molding machine and a comb molded therefrom. It was found that when the comb was placed in water and heated, softening started to take place at 58° C. A similar comb made from a similar composition prepared without the dihydro-acenaphthene polymer started to soften at 47° C.

*Example IV.*—Eight hundred grams of polyvinyl acetal resin prepared by the condensation of acetaldehyde with hydrolyzed polyvinyl acetate were mixed with 200 grams of polyvinyl acetate on heated rolls and 80 grams of dihydronaphthalene polymer and 20 grams of calcium stearate were then added and mixing continued. When incorporation was complete the mixture was removed from the rolls, cooled and pulverized to form an injection molding powder.

This molding powder was placed in an injection molding machine and a comb molded therefrom.

This comb was found to have a softening point of about 55° C. while a similar comb made from a similar mixture prepared without the dihydronaphthalene polymer had a softening point of about 40° C.

*Example V.*—One thousand grams of a polyvinyl acetal resin prepared by the condensation of acetaldehyde and hydrolyzed polyvinyl acetate were mixed on heated rolls with eighty grams of a hydrogenated dihydronaphthalene polymer having a melting point of 170° C. The mixture was cooled and pulverized to form a molding powder. This molding powder was placed in an injection molding machine and a brush handle molded therefrom.

The finished handle had a high luster and an irridescence resembling mother of pearl.

In the above examples incorporation of the dihydronaphthalene polymer with the polyvinyl compounds was carried out on heated rolls but any other convenient method of incorporation may be equally well employed.

As indicated by the above examples, the present invention includes within its scope the addition of various pigments, dyes, fillers, mold lubricants, and modifying agents such as will occur to those skilled in the plastics art, to the polyvinyl resin and polymers of dihydronaphthalene.

An advantage of the present invention is that it provides a practical means of obtaining a very unique and desirable effect, namely, the elevation of the softening point of polyvinyl resins without increasing the molding temperature thereof. A further and distinct advantage of the present invention is that it provides an economical and simple method of obtaining polyvinyl resin plastics having a pearl-like luster.

As many apparently widely different embodiments of this invention may be made without departing from the spirit and scope thereof, it is to be understood that the invention is not limited to the specific embodiments thereof except as defined in the appended claims.

I claim:

1. A molding composition comprising a polyvinyl resin from the group consisting of polyvinyl acetate and polyvinyl acetals, and a hydrogenated polymer of dihydronaphthalene having a melting point of 155–175° C., in an amount of 1–10% by weight of said polyvinyl resin.

2. A molding composition comprising a polyvinyl resin from the group consisting of polyvinyl acetate and polyvinyl acetals, and a hydrogenated polymer of dihydronaphthalene having a melting point of 155–175° C., in an amount of 1–5% by weight of said polyvinyl resin.

3. A molding composition adapted to produce a molding having a pearl-like luster, comprising a polyvinyl resin from the group consisting of polyvinyl acetate and polyvinyl acetals, and a hydrogenated polymer of dihydronaphthalene having a melting point above 155° C., in an amount of 5–12% by weight of said polyvinyl resin.

4. A molding composition adapted to produce a molding having a pearl-like luster, comprising a polyvinyl resin from the group consisting of polyvinyl acetate and polyvinyl acetals, and a hydrogenated polymer of dihydronaphthalene having a melting point above 155° C., in an amount of 7–8% by weight of said polyvinyl resin.

5. A molding composition comprising a polyvinyl resin from the group consisting of polyvinyl acetate and polyvinyl acetals, and a hydrogenated polymer of dihydronaphthalene having a melting point above 155° C., in an amount not exceeding about 12% by weight of said polyvinyl resin.

ROGER G. AITKEN.